(12) United States Patent
Ouchi (10) Patent No.: US 8,930,020 B2
(45) Date of Patent: Jan. 6, 2015

(54) ROBOT CONTROL APPARATUS, ROBOT SYSTEM, AND ROBOT CONTROL METHOD

(75) Inventor: Makoto Ouchi, Suwa (JP)

(73) Assignee: Seiko Epson Corporation (JP)

( * ) Notice: Subject to any disclaimer, the term of this patent is extended or adjusted under 35 U.S.C. 154(b) by 293 days.

(21) Appl. No.: 13/614,371

(22) Filed: Sep. 13, 2012

(65) Prior Publication Data

US 2013/0073079 A1 Mar. 21, 2013

(30) Foreign Application Priority Data

Sep. 15, 2011 (JP) .................................. 2011-201467

(51) Int. Cl.
*G06F 19/00* (2011.01)
*G06F 3/00* (2006.01)

(52) U.S. Cl.
USPC ............ 700/245; 715/762; 715/771; 711/112

(58) Field of Classification Search
USPC ................. 715/762, 771, 864, 125, 763, 245; 711/112; 718/102, 100; 700/245, 95, 700/108

See application file for complete search history.

(56) References Cited

U.S. PATENT DOCUMENTS

| | | | |
|---|---|---|---|
| 6,584,377 B2 | 6/2003 | Saijo et al. | |
| 7,209,803 B2* | 4/2007 | Okamoto et al. | 700/245 |
| 7,584,019 B2* | 9/2009 | Feingold et al. | 700/245 |
| 7,844,908 B2* | 11/2010 | Kodosky et al. | 715/762 |
| 8,032,888 B2* | 10/2011 | Vengerov et al. | 718/102 |
| 8,612,870 B2* | 12/2013 | Kodosky et al. | 715/762 |
| 2004/0088478 A1* | 5/2004 | Hall | 711/112 |
| 2007/0038332 A1 | 2/2007 | Ozaki et al. | |
| 2008/0034310 A1* | 2/2008 | Kodosky et al. | 715/769 |
| 2010/0325571 A1* | 12/2010 | Kodosky et al. | 715/772 |
| 2011/0004882 A1* | 1/2011 | Vengerov et al. | 718/103 |

FOREIGN PATENT DOCUMENTS

| | | |
|---|---|---|
| JP | 2001-322079 | 11/2001 |
| JP | 2006-088282 | 4/2006 |
| JP | 2007-044825 | 2/2007 |
| JP | 2007-050461 | 3/2007 |
| JP | 2007-319999 | 12/2007 |

* cited by examiner

*Primary Examiner* — Ronnie Mancho (74) *Attorney, Agent, or Firm* — Harness, Dickey & Pierce, P.L.C.

(57) ABSTRACT

A robot control apparatus includes a scenario acquiring unit acquiring a scenario in which a plurality of instructions, each occupying at least one entity that performs an operation, the at least one entity of a plurality of resources containing a plurality of entities that perform operations as different resources, are arranged in a serial execution order; an instruction queue generating unit generating an instruction queue for each resource, the instruction queue in which the instructions which have not been executed yet and occupy the resource are arranged in the execution order described in the scenario; and an instruction executing unit making a robot execute the plurality of instructions in parallel, the instructions each being first in the execution order in the instruction queues corresponding to all of the resources to be occupied.

7 Claims, 10 Drawing Sheets

ROBOT CONTROL APPARATUS, ROBOT SYSTEM, AND ROBOT CONTROL METHOD

BACKGROUND

1. Technical Field

The present invention relates to robot control apparatus, robot systems, robot control methods, and robot control program products and, in particular, to the technology of interpreting and executing a scenario.

2. Related Art

In the past, a robot that performs an operation instructed by a human being has been known. On the other hand, as a robot described in JP-A-2006-088282 (Patent Document 1), a robot that can perform additional operations in parallel other than the operations instructed by a human being is also known. In such a robot, a correlation between operations that cannot be performed at the same time and a correlation between operations that have harmful effects if they are performed at the same time are defined in advance, and the robot performs operations that can be performed at the same time by referring to these correlations.

When a robot that performs operations which had been performed by a worker is introduced as a substitute for the worker, it is possible to save time and effort required to create a scenario if a scenario in which the work procedural steps performed by the worker are arranged in the order in which operations are performed can be created and made to be processed by the robot. On the other hand, when there are operations that can be performed in parallel, it is desirable to make the robot perform the work of the scenario efficiently by making the robot perform the operations in parallel. With a scenario in which instructions that can be executed in parallel are defined as the instructions to be executed in parallel, a robot control apparatus that has acquired such a scenario can perform the work of the scenario efficiently by executing the instructions as defined in the scenario. However, the work creating a scenario by referring to the correlation described in Patent Document 1 is complicated, and a scenario writer has to be engaged in that complicated work.

SUMMARY

An advantage of some aspects of the invention is to provide the technology that makes it possible to execute instructions by determining whether or not the instructions can be executed in parallel even when a scenario in which parallel execution of instructions is not specified is acquired.

A robot control apparatus according to an aspect of the invention includes a scenario acquiring unit, an instruction queue generating unit, and an instruction executing unit. The scenario acquiring unit acquires a scenario containing a plurality of instructions, each occupying at least one entity that performs an operation, the at least one entity of a plurality of resources containing a plurality of entities that perform operations as different resources. In the scenario, the serial execution order of the plurality of instructions is designated. Here, a resource means an element that is used by the robot when executing the instruction and contains at least an entity that performs an operation, the entity provided in the robot system. Moreover, the resource may be an element outside the robot system. Occupying the resource means that the resource is used exclusively (that is, a plurality of instructions cannot use a single resource at the same time). Moreover, the plurality of entities that perform operations can operate independently.

The instruction queue generating unit generates an instruction queue for each resource based on the scenario, the instruction queue in which the instructions which have not been executed yet and occupy the resource are arranged in the execution order defined in the scenario. That is, the instruction queue generating unit allocates the instructions defined in the scenario to the instruction queues provided for the resources occupied by the instructions and arranges the instructions in each instruction queue in accordance with the execution order defined in the scenario. Therefore, for a certain resource, the order of the instructions stored in the instruction queue corresponding to the resource is consistent with the order of the instructions occupying the resource, the order defined in the scenario. In other words, the n+m-th instruction occupying the same resource as the instruction defined in the scenario as the n-th instruction to be executed is arranged in the instruction queue in such a way that the n+m-th instruction is executed later than the n-th instruction (n and m are natural numbers). Moreover, what is required of the instruction queue generating unit is to generate an instruction queue in which the instructions which have not been executed yet are arranged. For example, the instruction queue generating unit may delete the executed instruction from the instruction queue every time the instruction has been executed or may extract the instructions which have not been executed yet from the scenario every time an instruction has been executed and generate an instruction queue in which the extracted instructions are arranged.

The instruction executing unit executes the plurality of instructions in parallel, the instructions each being first in the execution order in the instruction queues corresponding to all of the resources to be occupied. Incidentally, "executing the plurality of instructions in parallel", that is, executing the instructions in parallel means executing the instructions in such a way that at least part of the period in which a certain instruction is being executed and at least part of the period in which another instruction is being executed overlap. It goes without saying that, when there is one instruction which is first in the execution order in the instruction queues corresponding to all of the resources to be occupied, the instruction executing unit executes the instruction. When there are three or more instructions each being first in the execution order in the instruction queues corresponding to all of the resources to be occupied, the instruction executing unit may execute all the instructions in parallel or execute at least two instructions of these instructions in parallel.

According to the aspect of the invention, when there are two or more instructions located at the heads of the instruction queues corresponding to all of the resources to be occupied, it is possible to execute the two or more instructions (the instructions occupying different resources) in parallel. Furthermore, since the instructions are arranged in each instruction queue in the order which is consistent with the execution order defined in the scenario, it is possible to execute the instructions occupying the resource corresponding to the instruction queue in the order which is consistent with the execution order of the instructions, the execution order described in the scenario. Therefore, according to the aspect of the invention, even when a scenario in which parallel execution of instructions is not specified is acquired, it is possible to execute the instructions after determining whether or not parallel execution can be performed.

Furthermore, in the robot control apparatus according to the aspect of the invention, the plurality of resources may contain, as different resources, a plurality of objects to be operated which are occupied by the instruction. The object to be operated means an object to be operated by the entity that performs an operation.

Therefore, in this case, the instructions are executed on the object to be operated in the order which is consistent with the order defined in the scenario.

In addition, in the robot control apparatus according to the aspect of the invention, the plurality of resources may contain, as different resources, a plurality of operation positions which are occupied by the instruction. The operation position means the position in which an operation by the entity that performs an operation is to be performed.

Therefore, in this case, the instructions are executed in the operation positions in the order which is consistent with the order defined in the scenario.

Furthermore, in the robot control apparatus according to the aspect of the invention, the plurality of entities that perform operations may be a plurality of robot arms which are different from each other.

In this case, it is possible to execute a plurality of instructions in parallel with the plurality of robot arms.

Moreover, in the robot control apparatus according to the aspect of the invention, the scenario acquiring unit may acquire the scenario in which the plurality of instructions occupying the resources designated by a scenario writer are arranged in the serial execution order designated by the scenario writer.

Therefore, what is required of a scenario writer is to create a scenario in which the instructions, each designating a resource, are serially arranged in the execution order, and there is no need for the scenario writer to create a scenario in which the instructions are arranged in such a way that the instructions are executed in parallel by considering whether or not the instructions can be executed in parallel.

It is to be noted that the functions of the units described in the aspect of the invention are implemented by a hardware resource whose function is specified by the configuration itself, a hardware resource whose function is specified by a program product, or a combination thereof. Moreover, the functions of the units are not limited to the functions implemented by physically independent hardware resources. Furthermore, the invention can be implemented as a robot system including the units of the robot control apparatus described above, a robot control method, a robot control program product that makes a computer implement the functions, and a recording medium of the program product. It goes without saying that the recording medium of the computer program product may be a magnetic recording medium, a magneto-optical recording medium, or any recording medium which will be developed in the future.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings. It is to be noted that common component elements found in the drawings are identified with the same reference characters, and overlapping explanations will be omitted.

1. First Embodiment 1-1. Configuration

Figure 1:
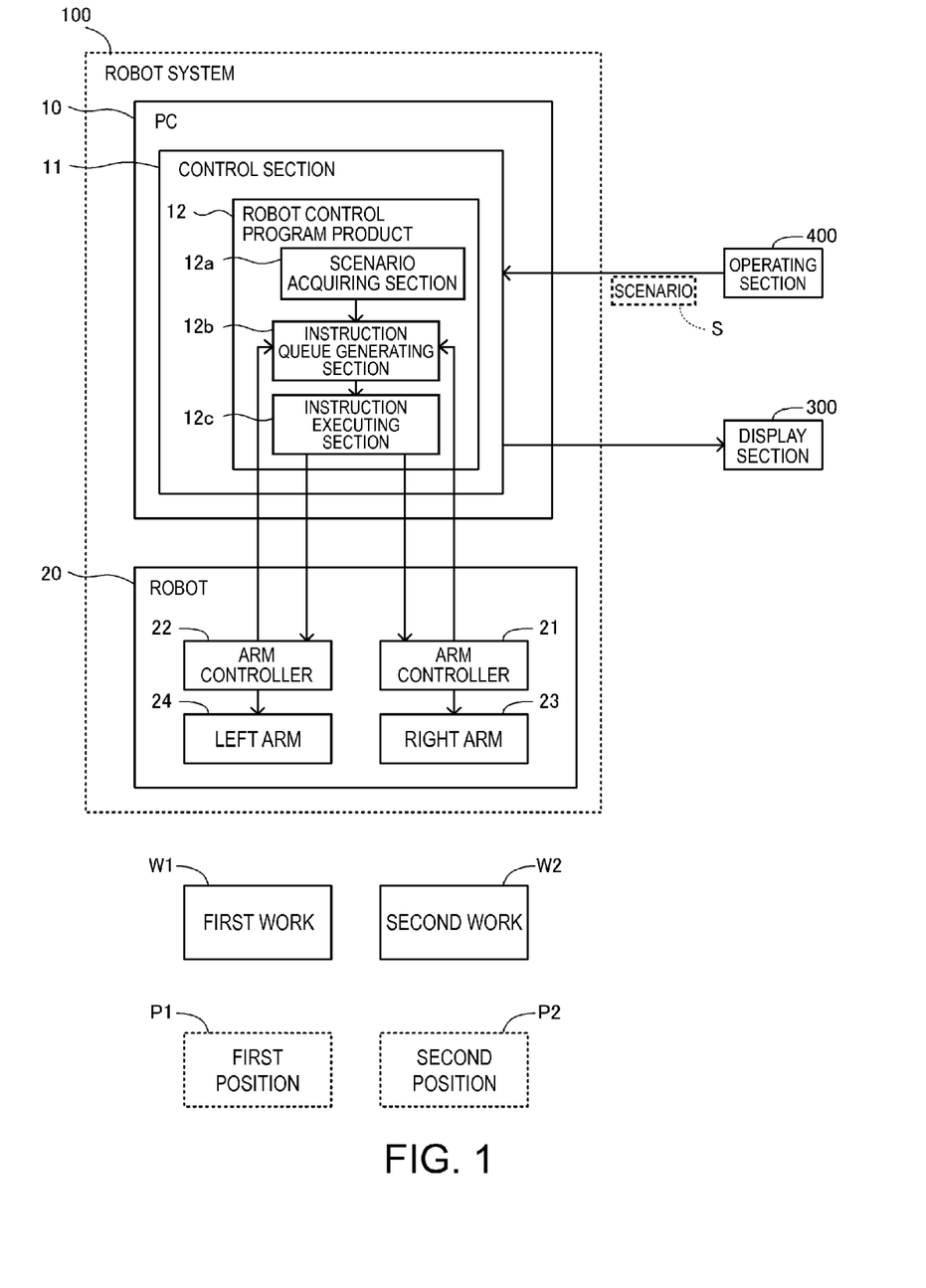
FIG. 1 is a block diagram of a robot system according to a first embodiment.

FIG. 1 is a block diagram showing the configuration of a robot system 100 according to the embodiment of the invention. The robot system 100 includes a PC (personal computer) 10 and a robot 20. The PC 10 includes a control section 11 provided with a CPU, RAM, ROM, etc., an unillustrated HDD (hard disk drive), an external I/F such as USB (Universal Serial Bus) for performing communication with an external device, and the like. The control section 11 is connected, via the external I/F, to an operating section 400 such as a mouse and a keyboard and a display section 300 such as a monitor. The user of the PC 10 can provide instructions to the PC 10 by operating the operating section 400 and recognize various types of information displayed by the PC 10 with the display section 300. The PC 10 can load various program products stored in the ROM and the HDD into the RAM and execute the program products by the CPU. In this embodiment, the control section 11 executes a robot control program product 12 as one of these program products, making it possible to make the PC 10 function as a robot control apparatus. The PC 10 can transmit and receive various signals to and from the robot 20 via the external I/F.

Figure 2:
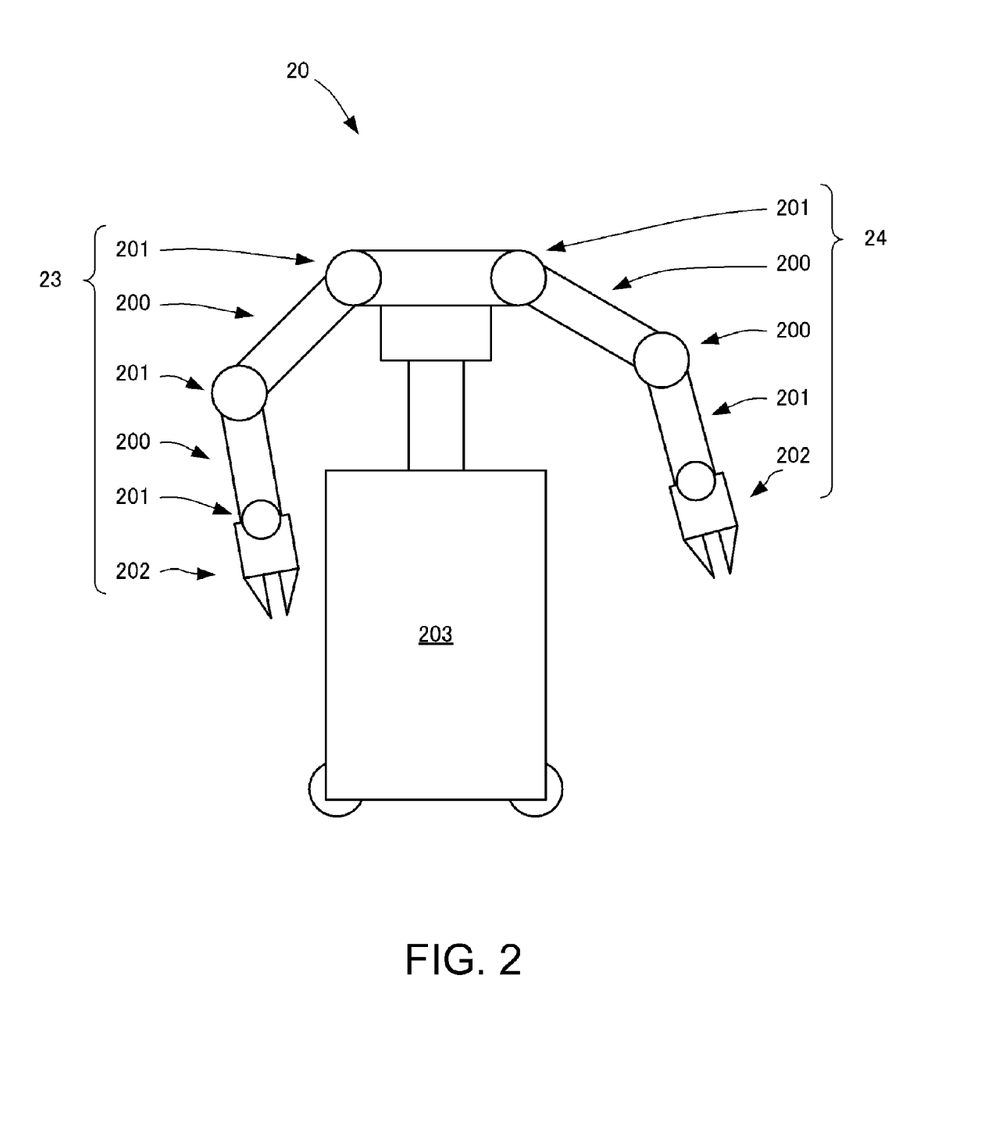
FIG. 2 is a schematic diagram showing a robot according to the first embodiment.

FIG. 2 is a schematic diagram showing the robot 20. The robot 20 includes arm controllers 21 and 22, a right arm 23, and a left arm 24. The right arm 23 and the left arm 24 are so-called robot arms, each being provided with an arm portion 200, a joint portion 201, a hand portion 202, etc., and are entities that perform operations such as "grasping" and "releasing" an object to be operated and "moving" to the object to be operated or an operation position in accordance with an instruction from the PC 10. The right arm 23 and the left arm 24 include various types of driving parts to perform these operations. The arm controller 21 performs control of the driving parts for making the right arm 23 which is a corresponding robot arm operate in response to the instruction provided by the control section 10 and notifies the control section 10 of the completion of the operation corresponding to the instruction. Likewise, the arm controller 22 performs control of the driving parts for making the corresponding left arm 24 operate in response to the instruction provided by the control section 10 and notifies the control section 10 of the completion of the operation corresponding to the instruction. A base 203 shown in FIG. 2 is a box-shaped member that indirectly supports the right arm 23 and the left arm 24. The PC 10 may be provided inside the base 203 or may be provided separately from the robot 20.

A first work W1 and a second work W2 are objects to be operated by the right arm 23 and the left arm 24. A first position P1 and a second position P2 are defined as positions (operation positions) in which operations by the right arm 23 and the left arm 24 are to be performed. For example, the first position P1 and the second position P2 are defined relative to the position of the robot 20. The right arm 23, the left arm 24, the first work W1, the second work W2, the first position P1, and the second position P2 correspond to resources.

The robot control program product 12 includes a scenario acquiring section 12a, an instruction queue generating section 12b, and an instruction executing section 12c. The scenario acquiring section 12a has the function of acquiring data indicating a scenario S created by the scenario writer. In this embodiment, the scenario is data of a plurality of instructions to be executed by the robot 20, the plurality of instructions arranged in accordance with a designated serial execution order. For example, the control section 11 acquires data indicating a scenario S which the scenario writer created by operating the operating section 400.

Figure 3:
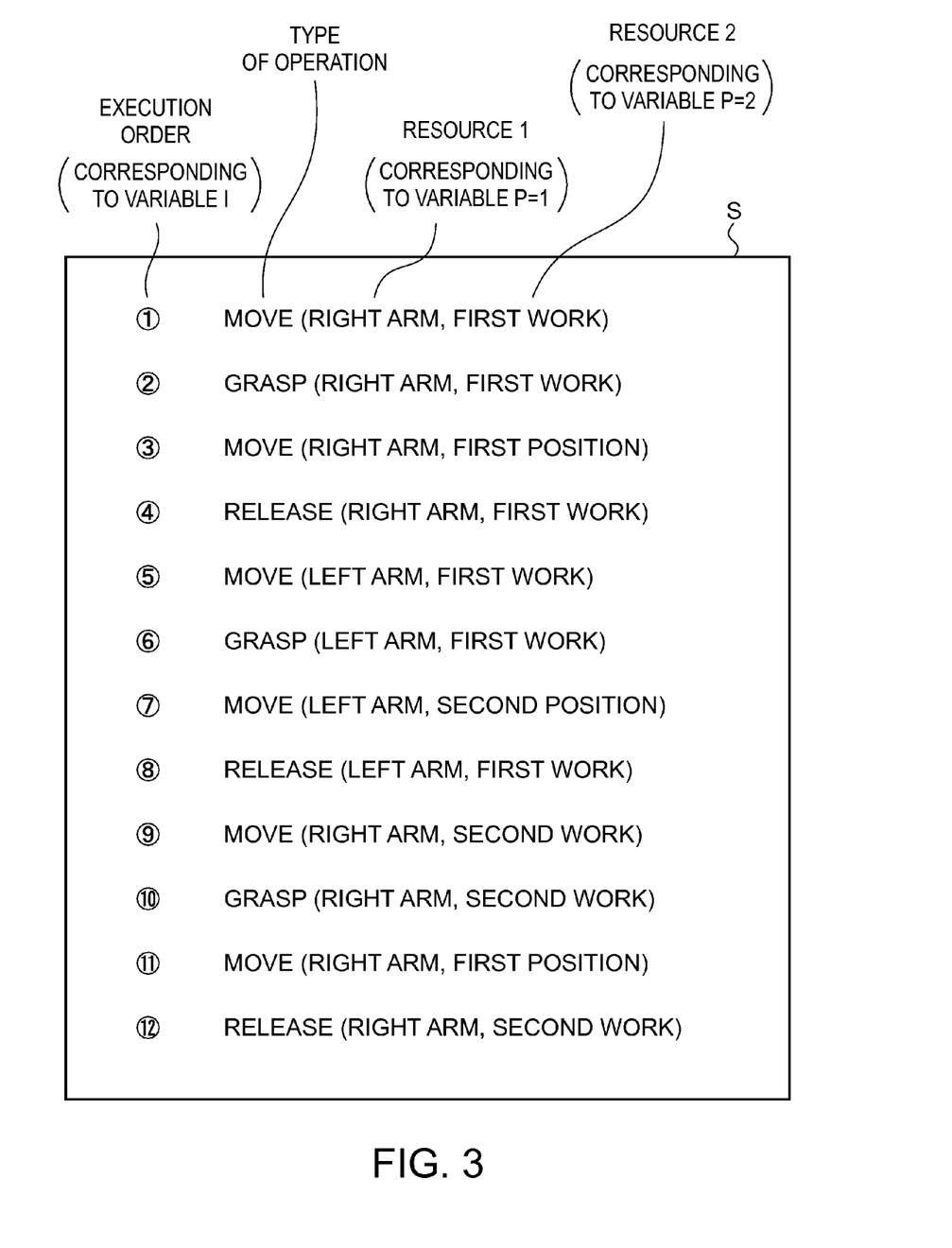
FIG. 3 is a diagram showing a scenario according to the first embodiment.

In FIG. 3, an example of the scenario S is shown. As shown in FIG. 3, in this embodiment, each instruction is defined in the form of "type of operation (resource 1, resource 2)". The type of operation includes "move", "grasp", "release", and the like. In the resource 1 and the resource 2, a resource which is occupied when the operation is performed is designated. More specifically, as the resource 1, a resource corresponding to an entity that performs an operation is designated. As the resource 2, a resource corresponding to an object to be operated or an operation position of the operation which is performed by the entity that performs an operation is designated. Therefore, for example, a first instruction "move (a right arm, a first work)" is an instruction "the right arm 23 moves to the first work W1". "Moving to the first work W1" means that the position of the first work W1 is specified and the right arm 23 moves to that position. As described above, the robot system 100 of this embodiment can move the arm by specifying the position of an object only by specifying the object without specifying a position in the instruction. Incidentally, the position in which the work is placed can be determined based on an image taken by an unillustrated image sensor of the robot 20, for example. Moreover, a second instruction "grasp (a right arm, a first work)" is an instruction "the right arm 23 grasps the first work W1".

The instruction queue generating section 12b has the function of generating, based on the scenario S, an instruction queue for each resource that is not permitted to be used by a plurality of instructions at the same time. In the instruction queue, an instruction occupying a resource corresponding to the instruction queue is stored in accordance with the execution order designated in the scenario S. Moreover, the instruction queue generating section 12b has the function of deleting an executed instruction from the head of the instruction queue corresponding to the resource occupied by the instruction based on the information indicating the completion of execution of the instruction, the information received from the arm controllers 21 and 22.

The instruction executing section 12c has the function of executing an instruction based on the generated instruction queue and, more specifically, has the function of executing an instruction which is first in the execution order in the instruction queues corresponding to all of the resources to be occupied. When there is one instruction which is first in the execution order in the instruction queues corresponding to all of the resources to be occupied, the instruction executing section 12c executes the instruction. Moreover, when there are a plurality of instructions, each being first in the execution order in the instruction queues corresponding to all of the resources to be occupied, the instruction executing section 12c executes the plurality of instructions in parallel.

1-2. Robot Control Based on Scenario

Figure 4:
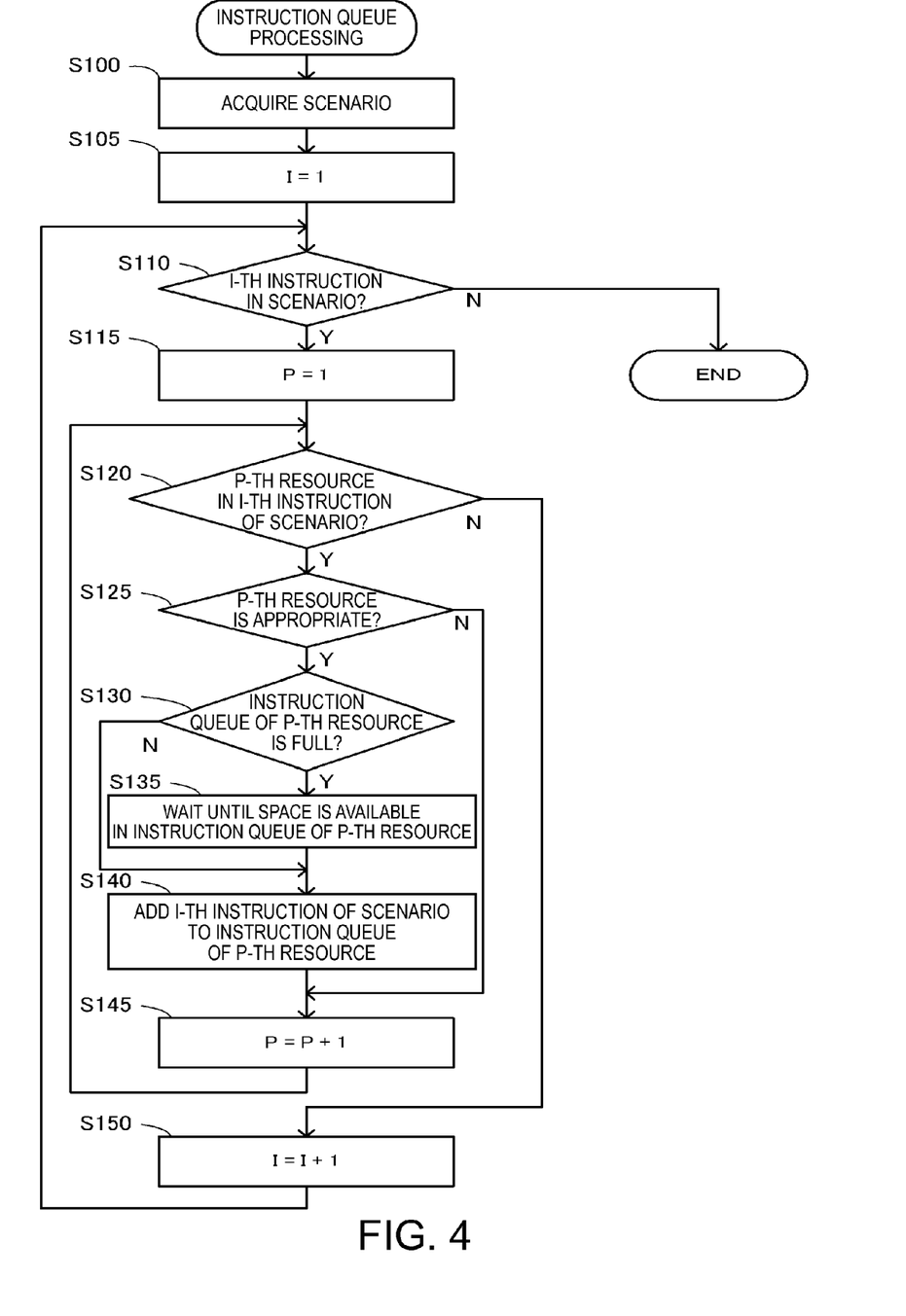
FIG. 4 is a flowchart showing instruction queue processing according to the first embodiment.
Figure 6:
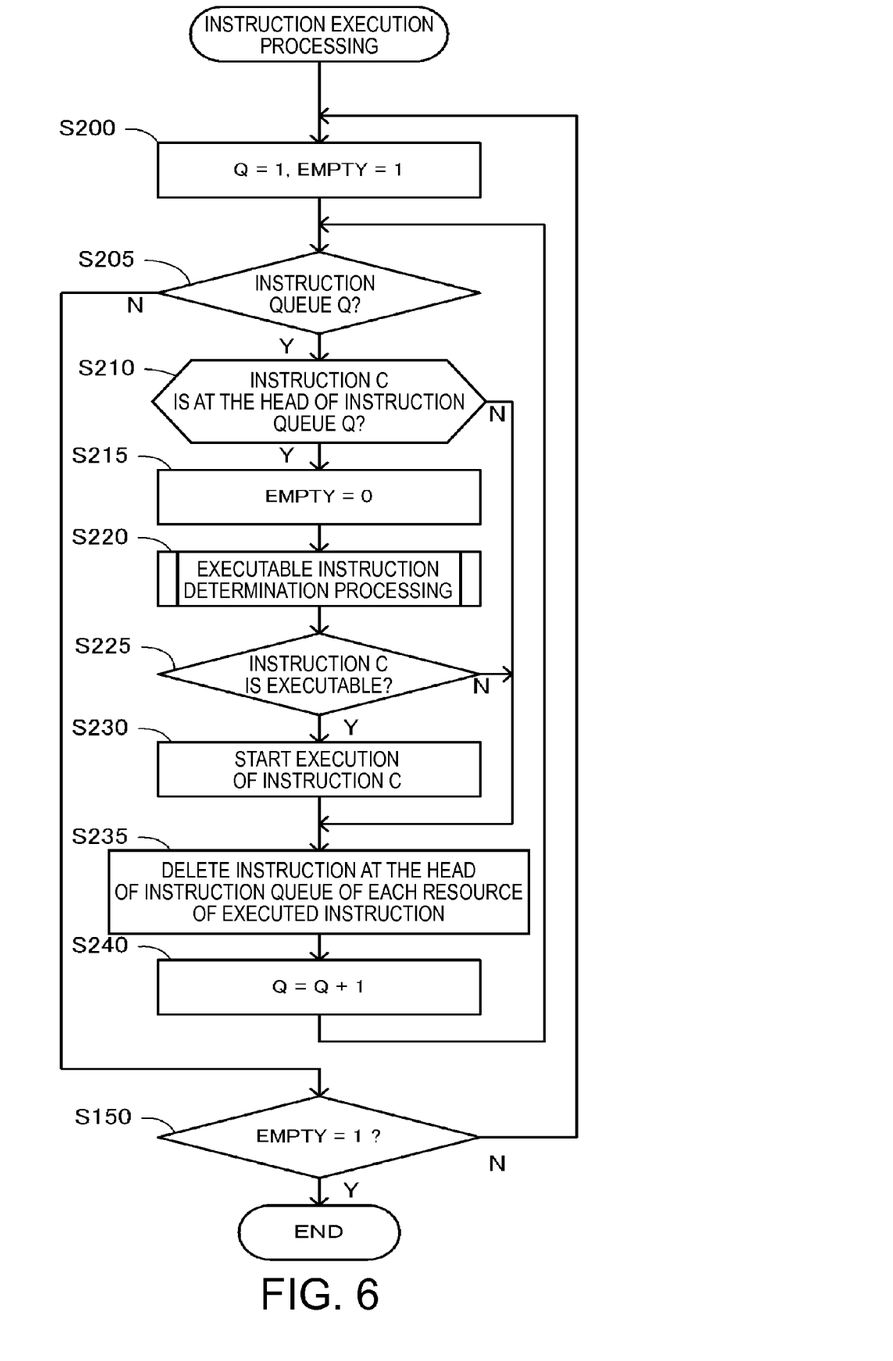
FIG. 6 is a flowchart showing instruction execution processing according to the first embodiment.

FIG. 4 is a flowchart showing the flow of instruction queue processing. FIG. 6 is a flowchart showing the flow of instruction execution processing. The instruction queue processing is processing for generating the above-mentioned instruction queue based on the scenario S. The instruction execution processing is processing for executing an instruction based on the instruction queue generated by the instruction queue processing. The instruction execution processing and the instruction queue processing are performed in parallel. The instruction queue processing of FIG. 4 will be described first. First, the control section 11 acquires the scenario S (S100). Then, the control section 11 substitutes "1" into a variable I (S105) and determines whether or not there is the I-th instruction in the scenario (S110). The variable I is a variable corresponding to the execution order of the instructions, the order designated in the scenario (see FIG. 3). If it is determined in S110 that there is the I-th instruction in the scenario, the control section 11 substitutes "1" into a variable P (S115). The variable P is a variable corresponding to the resource 1 and the resource 2 which are designated in the instruction (see FIG. 3). Then, the control section 11 determines whether or not there is the P-th resource in the I-th instruction of the scenario (S120). If there is the P-th resource in the I-th instruction of the scenario, the control section 11 determines whether or not the P-th resource is appropriate (S125). Specifically, the control section 11 determines whether or not a resource that cannot be used by the robot 20 is contained. Incidentally, the resources which the robot 20 can use are determined in advance, and the control section 11 makes the determination in S125 based on the information.

If it is determined in S125 that the P-th resource of the I-the instruction of the scenario is appropriate, the control section 11 determines whether or not the instruction queue corresponding to the P-th resource is full (S130). That is, the control section 11 determines whether or not the maximum number of instructions to be stored in an instruction queue have already been stored in the instruction queue. If it is determined in S130 that the instruction queue corresponding to the P-th resource is not full (there is a space in the instruction queue), the control section 11 adds the I-th instruction of the scenario to the tail of the instruction queue corresponding to the P-th resource of the I-th instruction of the scenario (S140) and increments the variable P (S145). If it is determined in S130 that the instruction queue corresponding to the P-th resource is full, the control section 11 waits until a space is available in the instruction queue corresponding to the P-th resource of the I-th instruction of the scenario (S135). When a space is available in the instruction queue corresponding to the P-th resource of the I-th instruction of the scenario as a result of the execution of the instruction execution processing, the control section 11 resumes the instruction queue processing from the processing in S140.

After incrementing the variable P in S145, the control section 11 goes back to the processing in S120. If it is determined in S120 that the P-th resource is not in the I-th instruction of the scenario, that is, in this embodiment, when the above-described processing of two resources is completed, the control section 11 increments the variable I (S150) and goes back to the processing in S110. If it is determined in S110 that there is no I-th instruction of the scenario, that is, when the allocation of all the instructions contained in the scenario to the instruction queues is completed, the control section 11 ends the instruction queue processing.

Figure 5A:
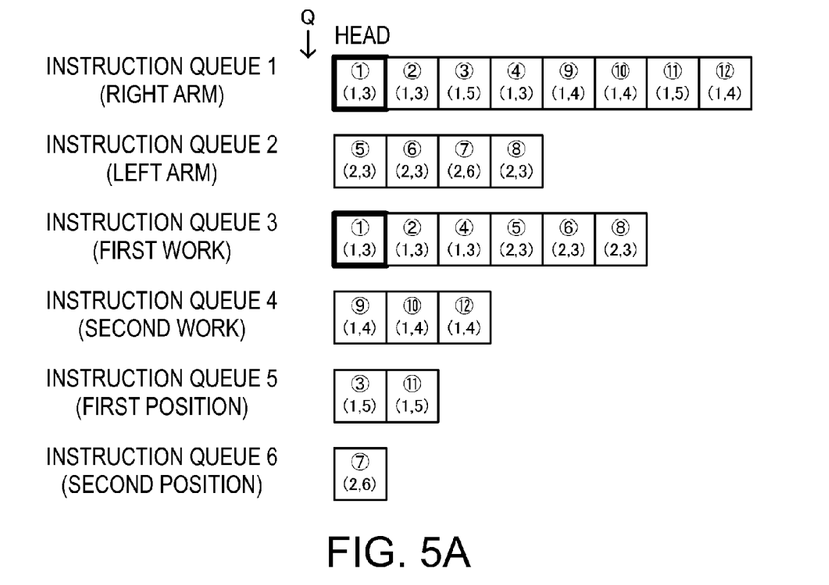
FIGS. 5A and 5B are diagrams showing instruction queues according to the first embodiment.

FIG. 5A shows instruction queues generated in the RAM as a result of the instruction queue processing having been executed based on the scenario S shown in FIG. 3. Incidentally, in this embodiment, a description will be given based on the premise that the maximum number of instructions that can be stored in each instruction queue is 9 or more (that is, based on the premise that it is possible to execute and end the instruction queue processing without waiting for the instruction queue processing in S135 of FIG. 4). Numbers are assigned to the instruction queues generated by the instruction queue processing. Here, the Q-th instruction queue is written as an instruction queue Q. In this embodiment, an instruction queue 1 is a queue in which the instructions occupying the right arm 23 are stored in the execution order. An instruction queue 2 is a queue in which the instructions occupying the left arm 24 are stored in the execution order. An instruction queue 3 is a queue in which the instructions occupying the first work W1 are stored in the execution order. An instruction queue 4 is a queue in which the instructions occupying the second work W2 are stored in the execution order. An instruction queue 5 is a queue in which the instructions occupying the first position P1 are stored in the execution order. An instruction queue 6 is a queue in which the instructions occupying the second position P2 are stored in the execution order. Incidentally, in this embodiment, an instruction queue Q (Q≥7) does not exist.

The first instruction designated in the scenario S is "move (a right arm, a first work)". In FIGS. 5A and 5B and FIGS. 8A to 8C and FIGS. 9A to 9C which will be described later, the instructions stored in an instruction queue are each expressed by using a numeric indicating the order of the instructions designated in the scenario S and two bracketed numerics written under the above numeric. The two bracketed numerics indicate the numbers of the instruction queues corresponding to the resources designated in the instruction. FIG. 5A shows that the first instruction "move (a right arm, a first work)" of the scenario S is stored at the head of the instruction queue 1 corresponding to the right arm 23 which is a resource occupied by the first instruction of the scenario S. Moreover, FIG. 5A also shows that the first instruction "move (a right arm, a first work)" of the scenario S is also stored at the head of the instruction queue 3 corresponding to the first work W1 which is the second resource also occupied by the first instruction of the scenario S.

Next, the instruction execution processing will be described. The instruction execution processing is processing to start executing an executable instruction by repeatedly checking the instruction at the head of the instruction queue corresponding to each resource until all the instruction queues become empty and deleting the executed instruction from the head of the instruction queue in which the instruction is stored. First, the control section 11 substitutes "1" into the variable Q and substitutes "1" into a variable EMPTY (S200). As described earlier, the variable Q corresponds to a number indicating each instruction queue. The variable EMPTY is a variable indicating that the instruction queues corresponding to all the resources are empty when the value of the variable EMPTY is "1" and that the instruction queue corresponding to at least any one of the resources is not empty when the value of the variable EMPTY is "0", which will be described later. Then, the control section 11 determines whether or not there is an instruction queue Q (S205). If there is an instruction queue Q, the control section 11 determines whether or not the instruction queue is empty, that is, whether or not there is an instruction at the head of the instruction queue Q (S210). The instruction at the head of the instruction queue Q is hereinafter referred to as an instruction C. If it is determined in S210 that there is an instruction C at the head of the instruction queue Q, the control section 11 substitutes "0" into the variable EMPTY (S215) and performs executable instruction determination processing (S220).

Figure 7:
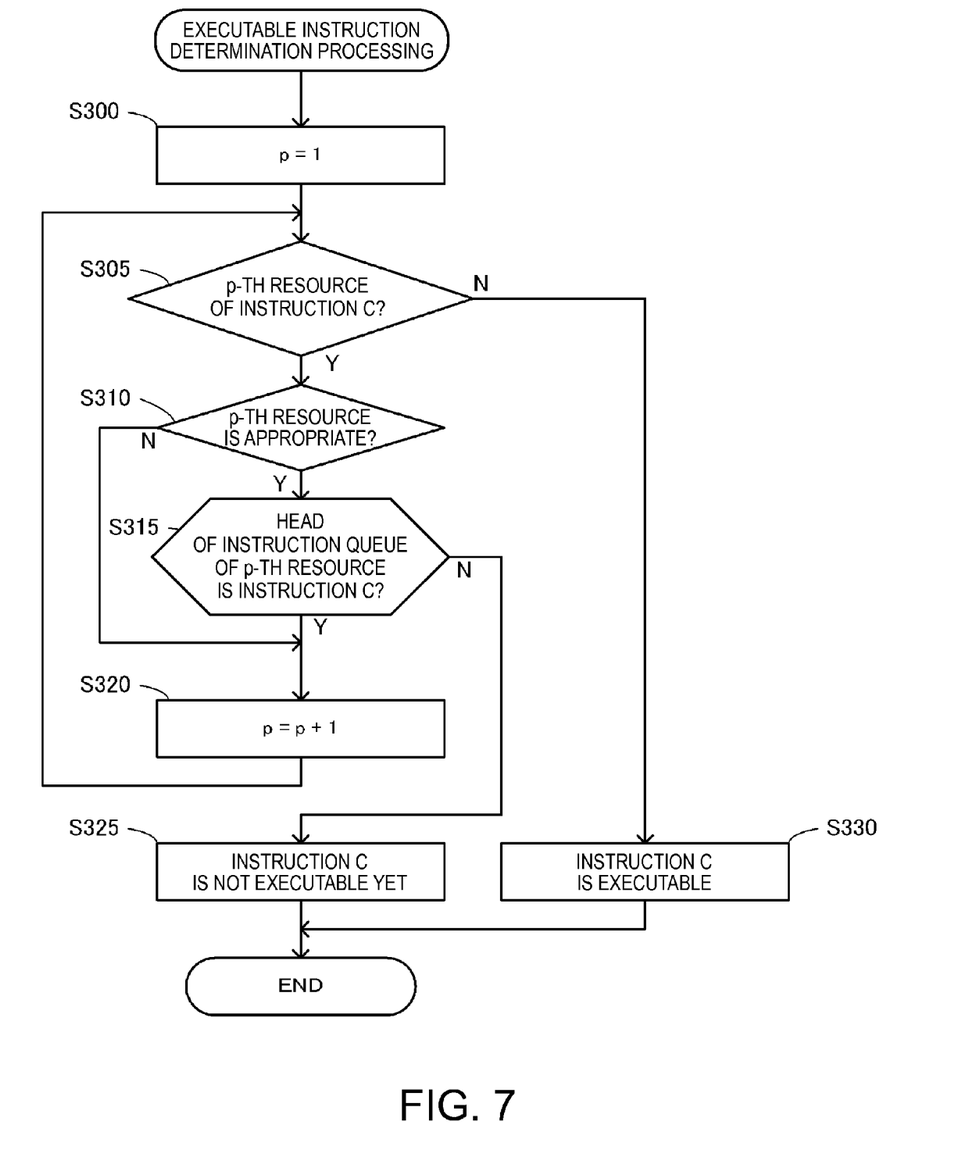
FIG. 7 is a flowchart showing executable instruction determination processing according to the first embodiment.

FIG. 7 is a flowchart showing the flow of the executable instruction determination processing. First, the control section 11 substitutes "1" into a variable p (S300). Incidentally, the variable P used in the instruction queue processing and the variable p used in the executable instruction determination processing are different from each other. Then, the control section 11 determines whether or not there is the p-th resource of the instruction C (the instruction at the head of the instruction queue Q) (S305). If there is the p-th resource of the instruction C, the control section determines whether or not the p-th resource of the instruction C is appropriate as in S125 (S310). If it is determined in S310 that the value of the p-th resource of the instruction C is not appropriate, the control section 11 proceeds to processing in S320. If it is determined in S310 that the value of the p-th resource of the instruction C is appropriate, the control section 11 determines whether or not the head of the instruction queue corresponding to the p-th resource of the instruction C is an instruction C (S315). If the head is not an instruction C, the control section 11 determines that the instruction C is not executable yet (S325) and ends the executable instruction determination processing.

If it is determined in S315 that an instruction C is stored at the head of the instruction queue corresponding to the p-th resource of the instruction C, the control section 11 increments the variable p (S320) and goes back to the processing in S305. If it is determined in S305 that there is no p-th resource of the instruction C, that is, when the processing of two resources of the instruction C is completed, the control section 11 determines that the instruction C is executable (S330) and ends the executable instruction determination processing. Now, the description of the instruction execution processing of FIG. 6 will be continued. Next, the control section 11 determines whether or not it has been determined that the instruction C is executable in the executable instruction determination processing in S220 (S225). If it has been determined that the instruction C is executable, the control section 11 starts executing the instruction C (S230). Specifically, the control section 11 transmits information to start executing the instruction C to the arm controller 21 or the arm controller 22 via the external I/F. The arm controller 21 or the arm controller 22 drives the corresponding driving parts based on the information. This makes it possible to make the right arm 23 or the left arm 24 as an entity that performs an operation operate according to the instruction.

Then, the control section 11 deletes the instruction at the head of the instruction queue (that is, the executed instruction) corresponding to each resource of the executed instruction based on the information indicating the completion of execution of the instruction, the information received from the arm controller 21 or 22 (S235). Incidentally, if there is no executed instruction when processing in S235 is performed, the control section 11 does no processing in S235 and proceeds to processing in S240. The control section 11 also performs the processing in S235 when it is determined in S210 that there is no instruction C at the head of the instruction queue Q and when it is determined in S225 that the instruction C is not executable. The instruction execution processing is loop processing which is repeatedly performed until all the instructions described in the scenario are executed. Since the processing in S235 is processing which is performed every time the loop processing is repeated, the completion of execution of the instruction is monitored, and, when the execution of the instruction is completed, it is possible to perform processing to delete the instruction from the instruction queue. Then, the control section 11 increments the variable Q (S240) and goes back to the processing in S205. If it is determined in S205 that there is no instruction queue Q, that is, in this embodiment, when all the heads of the six instruction queues have been checked, the control section 11 determines whether or not the value of the variable EMPTY is "1" (S150). If the value of the variable EMPTY is not "1" in S150, the control section 11 goes back to the processing in S200; when the value of the variable EMPTY is "1", the control section 11 ends the instruction execution processing. This is the end of the description of the instruction execution processing. Next, based on the instruction queues shown in FIG. 5A, the instruction queues generated as a result of the instruction queue processing having been performed on the scenario S, the state of each instruction queue in the course of the instruction execution processing will be described. Incidentally, in this embodiment, it is assumed that the amounts of time required to execute the instructions (the time between the start of execution and the end of execution) are nearly equal.

FIGS. 5A and 5B, FIGS. 8A to 8C, and FIGS. 9A to 9C are diagrams showing the state of each instruction queue in the course of the instruction execution processing. First, as described earlier, FIG. 5A shows a state in which all the instructions designated in the scenario S are allocated, in the execution order by the instruction queue processing, to the instruction queues corresponding to the resources occupied by the instructions. When the control section 11 performs S200 to S225 of the instruction execution processing in this state, since the first instruction of the scenario S is stored at the heads of the instruction queues (the instruction queue 1 and the instruction queue 3) corresponding to two resources of the instruction which is stored at the head of the instruction queue 1 and is designated as first in the execution order in the scenario S, the control section 11 determines in S225 that the first instruction of the scenario S is executable. As a result, the control section 11 starts executing the first instruction of the scenario S. In S235, right after the start of the execution, when the first instruction of the scenario S has been executed, the instruction is deleted from the instruction queue 1 and the instruction queue 3; when the first instruction of the scenario S has not been executed, the instruction is not deleted from the instruction queue 1 and the instruction queue 3, and, in S240, the variable Q is incremented and the processing from S210 is repeated. When the variable Q is 3, that is, when the instruction at the head of the instruction queue 3 is checked, if the first instruction of the scenario S has not been executed, the first instruction of the scenario S still exists at the head of the instruction queue 3. However, the control section 11 stores the instruction which was started and does not start executing the executed instruction again.

Figure 5B:
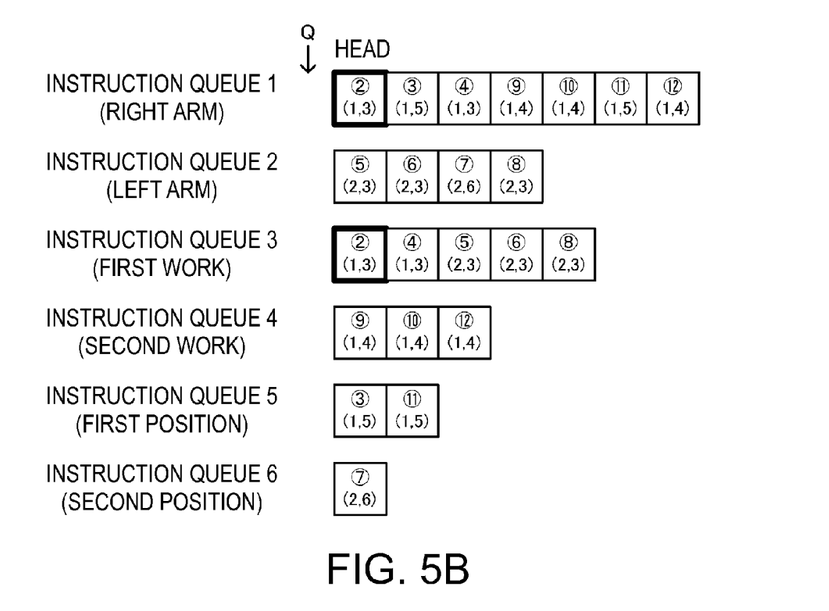
Figure 8A:
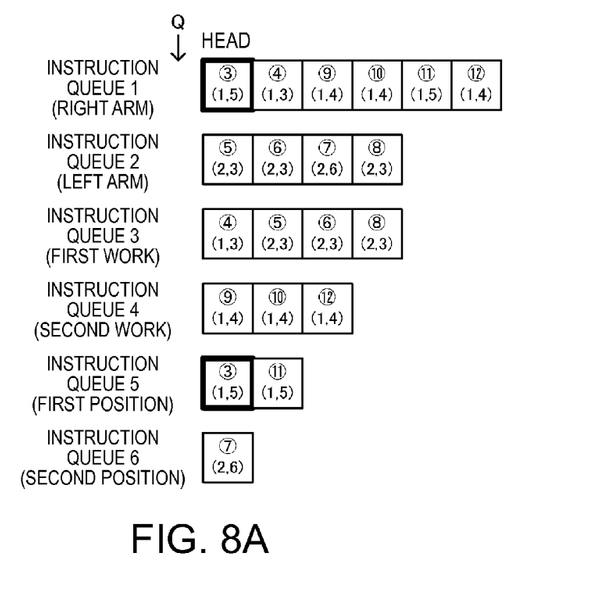
FIGS. 8A to 8C are diagrams showing instruction queues according to the first embodiment.
Figure 8B:
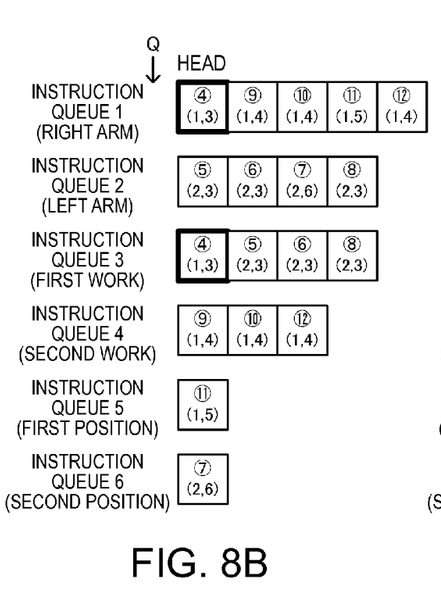

When the execution of the first instruction of the scenario S is completed, the control section 11 deletes the first instruction of the scenario S from the heads of the instruction queue 1 and the instruction queue 3 in S235. FIG. 5B shows the instruction queues after the deletion of the first instruction of the scenario S. In FIG. 5B, since the second instruction of the scenario S becomes executable, the control section 11 starts executing the second instruction of the scenario S as previously described, and, when the execution is completed, the control section 11 deletes the second instruction of the scenario S from the instruction queue 1 and the instruction queue 3. FIG. 8A shows the instruction queues after the deletion. In FIG. 8A, since the third instruction of the scenario S becomes executable, the control section 11 starts executing the third instruction of the scenario S as previously described, and, when the execution is completed, the control section 11 deletes the third instruction of the scenario S from the instruction queue 1 and the instruction queue 5. FIG. 8B shows the instruction queues after the deletion. After the control section 11 start executing the fourth instruction of the scenario S as previously described and the execution is completed, when the control section 11 deletes the fourth instruction from the instruction queue 1 and the instruction queue 3, the instruction queues become those shown in FIG. 8C.

Figure 8C:
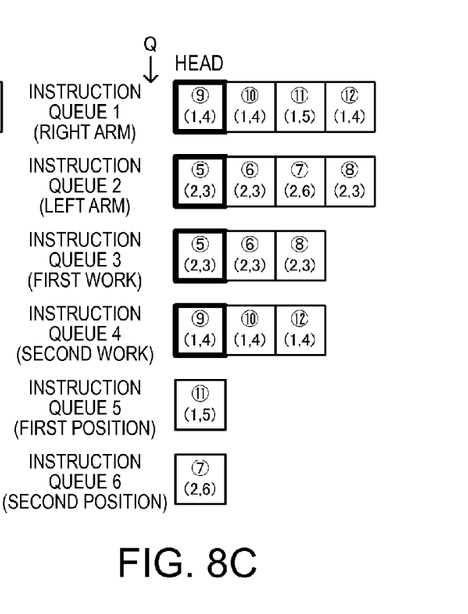

In the state shown in FIG. 8C, since the fifth instruction of the scenario S is stored at the heads of the instruction queue 2 corresponding to the left arm 24 which is one of the resources occupied by the instruction and the instruction queue 3 corresponding to the first work W1 which is the other of the resources occupied by the instruction, the control section 11 determines that the instruction is executable in the executable instruction determination processing and starts executing the instruction in S230. Moreover, in a state in which the execution of the fifth instruction of the scenario S is started and is not completed, since the ninth instruction of the scenario S is stored at the heads of the instruction queue 1 corresponding to the right arm 23 which is one of the resources occupied by the instruction and the instruction queue 4 corresponding to the second work W2 which is the other of the resources occupied by the instruction, the control section 11 determines that the instruction is executable in the executable instruction determination processing and starts executing the instruction in S230. Therefore, the fifth instruction and the ninth instruction of the scenario S are executed in parallel.

Figure 9A:
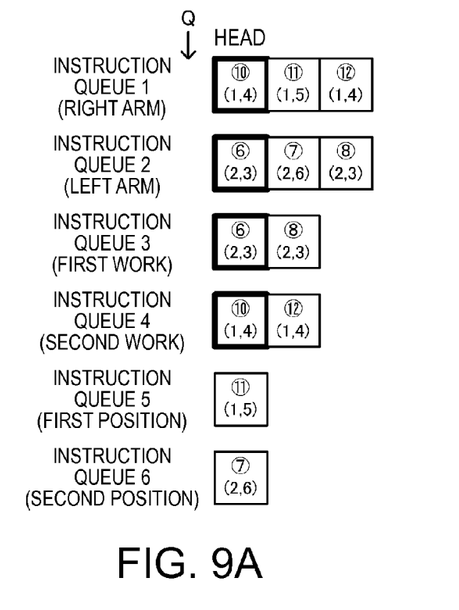
FIGS. 9A to 9C are diagrams showing instruction queues according to the first embodiment.
Figure 9B:
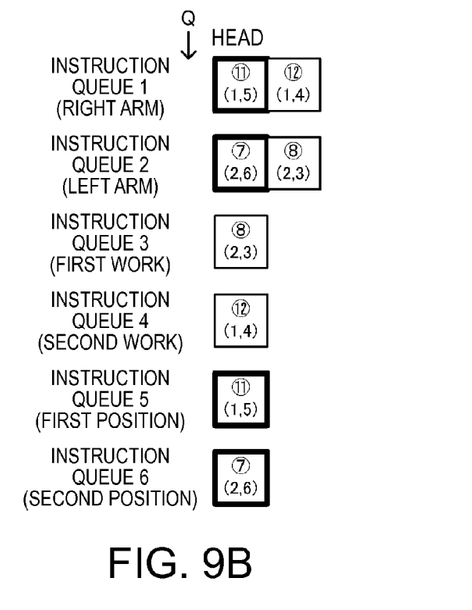
Figure 9C:
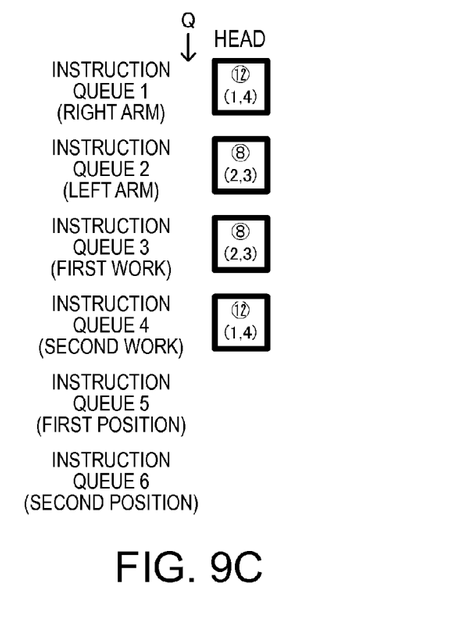

When the execution of the fifth instruction of the scenario S is completed, the control section 11 deletes the fifth instruction of the scenario S from the instruction queue 2 and the instruction queue 3. As a result, the instructions at the heads of the instruction queue 2 and the instruction queue 3 are each the sixth instruction of the scenario S. Since the sixth instruction of the scenario S is at the head of each of the instruction queues corresponding to the resources occupied by the instruction, the control section 11 starts executing the sixth instruction of the scenario S. Moreover, when the execution of the ninth instruction of the scenario S is completed, the control section 11 deletes the ninth instruction of the scenario S from the instruction queue 1 and the instruction queue 4. FIG. 9A shows the state of each queue after the deletion. As a result of the ninth instruction of the scenario S being deleted from the instruction queue 1 and the instruction queue 4, the instructions at the heads of the instruction queue 1 and the instruction queue 4 are each the tenth instruction of the scenario S. The control section 11 determines that the tenth instruction of the scenario S is executable and starts executing the instruction. Thereafter, by repeating the processing by which the execution of the instruction is started and then the instruction is deleted after the execution is completed in the same manner, the seventh and eleventh instructions of the scenario S are executed in parallel as shown in FIG. 9B, and the eighth and twelfth instructions of the scenario S are then executed as shown in FIG. 9C. Incidentally, although this embodiment assumes that the amounts of time required to execute the instructions are nearly equal, it goes without saying that the amounts of time required to execute the instructions may be different from one another.

Figure 10:
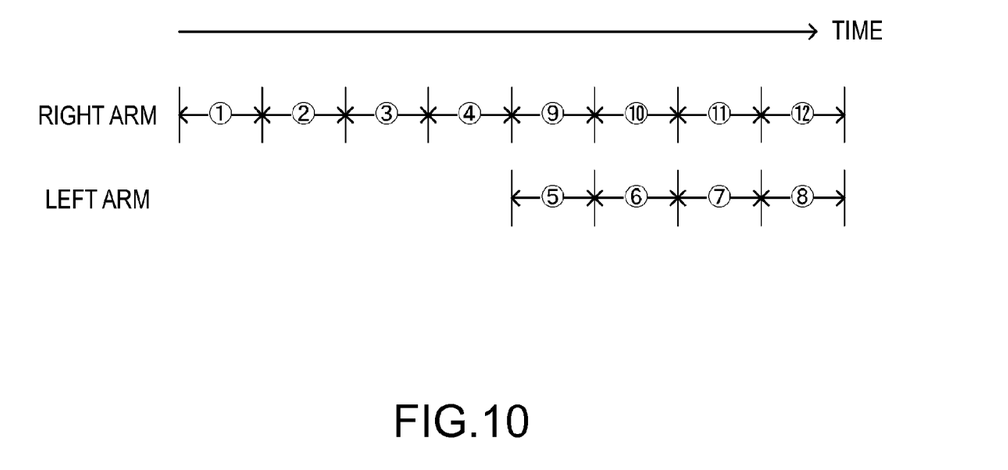
FIG. 10 is a diagram showing the order in which instructions are executed, the order according to the first embodiment.

FIG. 10 is a diagram showing the order in which instructions are executed when the instruction execution processing is performed based on the instruction queues shown in FIG. 5A. As shown in this drawing, according to this embodiment, the fifth to eighth instructions of the scenario and the ninth to twelfth instructions of the scenario are executed in parallel. Therefore, as compared to a case in which the instructions are executed in series in accordance with the serial execution order designated in the scenario S, it is possible to shorten the time required to execute all the instructions described in the scenario S. Moreover, since the instructions are arranged in each instruction queue in the order which is consistent with the execution order defined in the scenario S, it is possible to execute the instructions occupying the resource corresponding to the instruction queue in the order which is consistent with the execution order described in the scenario. Furthermore, when the scenario writer creates a scenario in which the instructions, each designating a resource, are serially arranged in the execution order, the robot control apparatus executes, in parallel, the instructions that can be executed in parallel based on the scenario. This eliminates the need for the scenario writer to create a scenario in which the instructions are arranged in such a way that the instructions are executed in parallel by considering whether or not the instructions can be executed in parallel, and makes it possible to reduce the work burden of the scenario writer.

2. Other Embodiments

It goes without saying that the technical scope of the invention is not limited to the embodiment described above and various changes can be made therein without departing from the spirit of the invention. For example, in addition to the robot arm, the entity that performs an operation can be applied to various resources forming the robot, such as a portion corresponding to a foot that moves the position of the whole robot and a portion corresponding to an eye that changes the angle of view of a camera taking an image of an object.

Moreover, in the embodiment described above, the number of resources designated in an instruction is two; however, three or more resources may be designated. Furthermore, when three or more instructions can be executed in parallel, it is necessary simply to execute at least two of the three or more executable instructions in parallel. It goes without saying that all of the three or more executable instructions may be executed in parallel.

The entire disclosure of Japanese Patent Application No. 2011-201467, filed Sep. 15, 2011 is expressly incorporated by reference herein.

What is claimed is:

1. A robot control apparatus comprising:
  a scenario acquiring unit acquiring a scenario in which a plurality of instructions, each occupying at least one entity that performs an operation, the at least one entity of a plurality of resources containing a plurality of entities that perform operations as different resources, are arranged in a serial execution order;
  an instruction queue generating unit generating an instruction queue for each resource, the instruction queue in which the instructions which have not been executed yet and occupy the resource are arranged in the execution order described in the scenario; and
  an instruction executing unit making a robot execute the plurality of instructions in parallel, the instructions each being first in the execution order in the instruction queues corresponding to all of the resources to be occupied.

2. The robot control apparatus according to claim 1, wherein
  the plurality of resources contain, as different resources, a plurality of objects to be operated which are occupied by the instruction.

3. The robot control apparatus according to claim 1, wherein
  the plurality of resources contain, as different resources, a plurality of operation positions which are occupied by the instruction.

4. The robot control apparatus according to claim 1, wherein
  the plurality of entities that perform operations are a plurality of robot arms which are different from each other.

5. The robot control apparatus according to claim 1, wherein
  the scenario acquiring unit acquires the scenario in which the plurality of instructions occupying the resources designated by a scenario writer are arranged in the serial execution order designated by the scenario writer.

6. A robot system comprising:
  a scenario acquiring unit acquiring a scenario in which a plurality of instructions, each occupying at least one entity that performs an operation, the at least one entity of a plurality of resources containing a plurality of entities that perform operations as different resources, are arranged in a serial execution order;
  an instruction queue generating unit generating an instruction queue for each resource, the instruction queue in which the instructions which have not been executed yet and occupy the resource are arranged in the execution order described in the scenario;
  an instruction executing unit making a robot execute the plurality of instructions in parallel, the instructions each being first in the execution order in the instruction queues corresponding to all of the resources to be occupied; and
  the plurality of entities that perform operations.

7. A robot control method comprising:
  acquiring a scenario in which a plurality of instructions, each occupying at least one entity that performs an operation, the at least one entity of a plurality of resources containing a plurality of entities that perform operations as different resources, are arranged in a serial execution order;
  generating an instruction queue for each resource, the instruction queue in which the instructions which have not been executed yet and occupy the resource are arranged in the execution order described in the scenario; and
  making a robot execute the plurality of instructions in parallel, the instructions each being first in the execution order in the instruction queues corresponding to all of the resources to be occupied.

* * * * *